Sept. 1, 1925.

L. IVERSEN 1,552,056

ROLLING MILL

Filed July 18, 1924

INVENTOR
Lorenz Iversen
By Byrnes, Stebbins & Parmelee
His Attys

Patented Sept. 1, 1925.

1,552,056

UNITED STATES PATENT OFFICE.

LORENZ IVERSEN, OF PITTSBURGH, PENNSYLVANIA, ASSIGNOR TO MESTA MACHINE COMPANY, OF PITTSBURGH, PENNSYLVANIA, A CORPORATION OF PENNSYLVANIA.

ROLLING MILL.

Application filed July 18, 1924. Serial No. 726,732.

*To all whom it may concern:*

Be it known that I, LORENZ IVERSEN, a citizen of the United States, residing at Pittsburgh, county of Allegheny, and State of Pennsylvania, have invented a new and useful Improvement in Rolling Mills, of which the following is a full, clear, and exact description.

The present invention relates to rolling mills, and more particularly to the driving connections between the driving means and the rolls.

In rolling mill practice, it is necessary to quite frequently remove the rolls for knurling or the like. This is usually done by lifting the rolls vertically out of their housings, since the rolls are ordinarily too large to be moved axially through the windows of the roll housings. In order to permit the removal of the rolls in this manner, it is necessary to disconnect the spindles which form the driving connections between rolls and their driving pinions. These spindles are usually connected to the rolls and driving pinions by universal joints, and it has heretofore been proposed to modify the joint between the end of a spindle and its driving pinion to permit shifting of the spindle axially in order to disconnect it from the roll. This is desirable because it enables the roll to be disconnected without unbolting and removing the removable bearing elements of the universal joint. These elements drop to the floor when unbolted and considerable difficulty and delay are experienced in replacing them in order to connect the spindle to the roll, since these elements are quite heavy. Furthermore, the modification of the universal joint between the end of the spindle and its driving pinion involves making the bifurcated portions of the spindle longer than usual, in order to permit the telescopic action between the end of the spindle and the cooperating element of the pinion. The lengthening of the bifurcated portions renders them liable to breakage.

By the present invention, I secure the advantages of the axially movable spindle by forming the spindle in two parts having telescopic interlocking connection between the same, whereby the spindle can be disconnected from its roll by a relative axial movement between the parts in a direction tending to collapse the spindle. This obviates the necessity for shifting the entire spindle axially or for modifying the universal joint between the end of the spindle and the pinion, and enables the spindle to be disconnected from its roll more expeditiously. Furthermore, this construction renders it unnecessary to provide for moving the spindle bearing back and forth in the direction of the axis of the spindle, although a sliding bearing with provision for moving the same can be provided, if desired.

In the drawings:—

Figure 1:
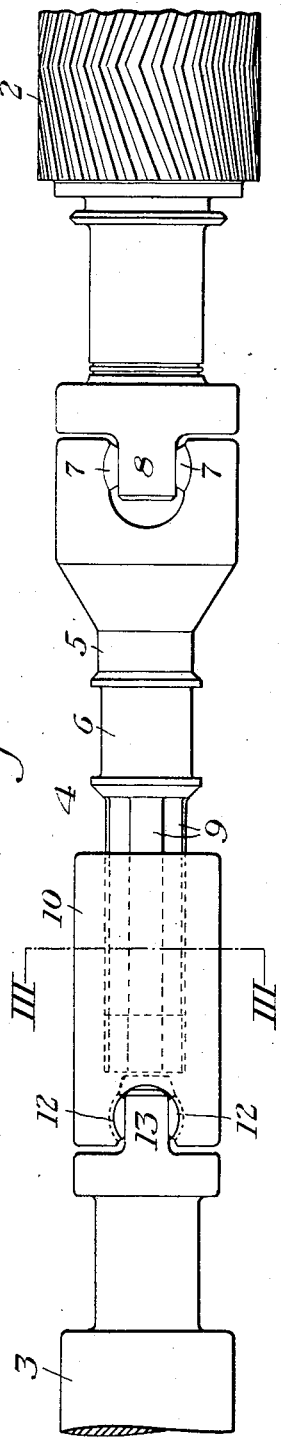
Figure 1 is a side elevation of a spindle constructed in accordance with my invention and of cooperating portions of a roll and driving pinion.

In the illustrated embodiment of the invention, the reference numeral 2 designates a driving pinion, and 3 a roll adapted to be driven thereby. The pinion and the roll are connected by a spindle 4. The spindle comprises a body member 5 having a bearing portion 6 intermediate its ends for cooperation with a spindle bearing of any suitable construction. The body member is bifurcated at one end and carries the usual bearing members 7 for cooperation with a coupling member 8 associated with the pinion 2, thus providing the usual universal joint between the end of the spindle and the driving pinion. The other end portion of the body member is formed with a plurality of longitudinal ribs 9 and has a sleeve 10 slidably mounted thereon, and formed with integral ribs 11 for interlocking engagement with the ribs 9. This sleeve carries bearing members 12 for cooperation with a coupling element 13 formed on the roll neck, thereby providing the usual universal joint between the sleeve and roll. The bearing members 12 carry a roller 14 journaled on a pin 15, this roller cooperating with the bifurcated coupling member 13, as in Iversen Patent No. 1,359,601, granted November 23, 1920. The bearing members 7 have a similar roller associated therewith.

Figure 2:
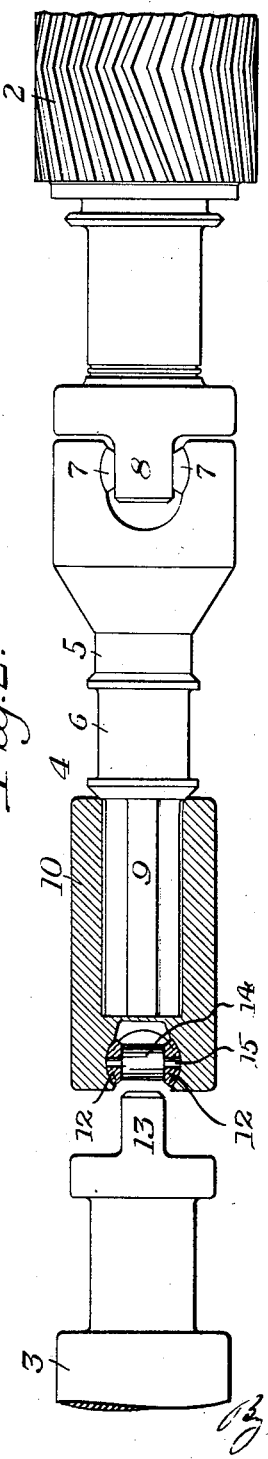
Figure 2 is a view similar to Figure 1, but showing the spindle partly in section and disconnected from the roll.
Figure 3:
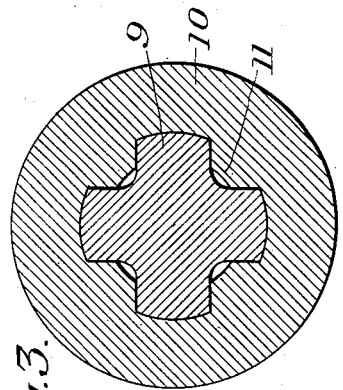
Figure 3 is a section on the line III—III of Figure 1.

It will be seen that in the position of the parts shown in Figure 1, there is a space between the end of the bearing portion 6 and the end of the sleeve 10 sufficient to permit the sleeve to be slid on the body member 5 a sufficient distance to disconnect the spindle from the roll. When the spindle is connected with the roll, wooden blocks may be inserted in the exposed portions of the grooves between the ribs 9 in order to prevent the unintentional disconnection of the spindle from the roll. When it is desired to disconnect the spindle from the roll, these blocks may be removed and the sleeve 10 moved axially of the body member 5 in a direction tending to collapse the spindle. This will disconnect the spindle from the roll, as illustrated by Figure 2. Furthermore, with this construction, it is possible to move the body member 5 relative to the sleeve 10 if it should be desired to disconnect the spindle from the pinion, or in case the sleeve is coupled to the pinion and the body member to the roll.

While I have shown and described a preferred embodiment of my invention, it will be understood that changes may be made in the details of construction without departing from the spirit of the invention or scope of the appended claims.

I claim:

1. In a rolling mill, a driving member, a driven roll, and a spindle connecting said member and roll, there being a universal joint between one end of said spindle and one of said parts which it connects, said spindle being collapsible to uncouple it from said part at said joint, substantially as described.

2. In a rolling mill, a driving member, a driven roll, and a spindle connecting said member and roll and formed in two telescopic interlocking parts, one of which is connected to said roll by a universal joint, said parts being relatively movable in a direction to collapse said spindle and thereby disconnect it from said roll at said joint, substantially as described.

3. In a rolling mill, a driving member having a universal coupling element, a driven roll having a universal coupling element, and a spindle connecting said member and roll, said spindle comprising a body member having a bearing portion intermediate its ends and formed with a universal coupling element at one end, and a sleeve having sliding interlocking engagement with the other end of said body member and formed with a universal coupling element adapted to be disconnected by sliding said sleeve on said body member in a direction to collapse said spindle, substantially as described.

In testimony whereof I have hereunto set my hand.

LORENZ IVERSEN.